United States Patent
Kamiya

(10) Patent No.: US 9,966,811 B2
(45) Date of Patent: May 8, 2018

(54) METHOD FOR MANUFACTURING AN ELECTRIC MOTOR STATOR INCLUDING RESIN-MOLDED UNIT, AND ELECTRIC MOTOR HAVING SUCH A STATOR

(71) Applicant: FANUC CORPORATION, Yamanashi (JP)

(72) Inventor: Youhei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 96 days.

(21) Appl. No.: 15/049,647

(22) Filed: Feb. 22, 2016

(65) Prior Publication Data

US 2016/0172922 A1 Jun. 16, 2016

Related U.S. Application Data

(62) Division of application No. 14/297,057, filed on Jun. 5, 2014, now Pat. No. 9,337,702.

(30) Foreign Application Priority Data

Jun. 11, 2013 (JP) .................................. 2013-122475

(51) Int. Cl.
*H02K 15/02* (2006.01)
*H02K 5/08* (2006.01)
(Continued)

(52) U.S. Cl.
CPC .................. *H02K 5/08* (2013.01); *H02K 5/10* (2013.01); *H02K 5/225* (2013.01); *H02K 15/02* (2013.01);
(Continued)

(58) Field of Classification Search
CPC .......... H02K 15/12; H02K 15/14; H02K 5/08; H02K 5/225; Y10T 29/49009
See application file for complete search history.

(56) References Cited

U.S. PATENT DOCUMENTS

| 3,638,055 A | 1/1972 | Zimmermann | |
|---|---|---|---|
| 9,337,702 B2* | 5/2016 | Kamiya | H02K 5/08 |
| 2016/0172922 A1* | 6/2016 | Kamiya | H02K 5/08 |
| | | | 310/43 |

FOREIGN PATENT DOCUMENTS

| DE | 1935929 A1 | 1/1971 |
|---|---|---|
| JP | 01198255 A | 8/1989 |

(Continued)

OTHER PUBLICATIONS

English Abstract for Japanese Publication No. 2000-245094 A, published Sep. 8, 2000, 1 pg.
(Continued)

*Primary Examiner* — Minh Trinh
(74) *Attorney, Agent, or Firm* — Fredrikson & Byron, P.A.

(57) ABSTRACT

A method for manufacturing an electric motor stator, including: attaching a hollow bracket to an end of a hollow stator core and allowing a lead connected to the winding to pass through an opening formed in a peripheral surface of the bracket to take out the lead to an outside of the bracket; placing a core material inside the stator core and the bracket; attaching a sealing member to an outer peripheral surface of the bracket so as to block the opening while allowing the lead to pass through the through-hole; and filling a molten resin into an annular space between the stator core and the core material and between the bracket and the core material, to form a resin unit.

2 Claims, 7 Drawing Sheets

(51) Int. Cl.
*H02K 5/22* (2006.01)
*H02K 5/10* (2006.01)
H02K 15/12 (2006.01)
H02K 15/14 (2006.01)

(52) U.S. Cl.
CPC ............ *H02K 15/12* (2013.01); *H02K 15/14* (2013.01); *Y10T 29/49009* (2015.01)

(56) References Cited

FOREIGN PATENT DOCUMENTS

| | | |
|---|---|---|
| JP | 05056611 A | 3/1993 |
| JP | 2000245094 A | 9/2000 |

OTHER PUBLICATIONS

English Abstract Japanese Publication No. 05056611 A, published Mar. 5, 1993.
English Abstract Japanese Publication No. 01-198255 A, published Aug. 9, 1989.

* cited by examiner

METHOD FOR MANUFACTURING AN ELECTRIC MOTOR STATOR INCLUDING RESIN-MOLDED UNIT, AND ELECTRIC MOTOR HAVING SUCH A STATOR

RELATED APPLICATIONS

This is a divisional of U.S. application Ser. No. 14/297,057, filed Jun. 5, 2014 and issued as U.S. Pat. No. 9,337,702, which claims priority to Japanese Application No. 2013-122475, filed Jun. 11, 2013, the contents of each of which are herein incorporated by reference.

BACKGROUND OF THE INVENTION

1. Field of the Invention

The present invention relates to a method for manufacturing an electric motor stator including a resin-molded unit, to an electric motor stator, and to an electric motor.

2. Description of the Related Art

As a method for manufacturing such an electric motor stator, for example, a method described in Japanese Laid-open Patent Publication No. 5-56611 (JP 5-056611 A) has been known. In the method described in JP 5-056611 A, brackets are attached to both ends of a hollow stator core to form a stator, and the stator is installed upright between upper and lower dies. A core material is installed upright from the lower die and is inserted into the insides of the stator core and the brackets. In this state, a resin is injected by pressurization through a resin inlet formed in the lower bracket, and the resin is filled between the stator core and the core material and between the brackets and the core material, to form a resin unit in the stator.

An opening that passes through the brackets in a radial direction may be formed in the brackets of an electric motor stator in order to take out a lead connected to a winding to the outside of the stator. However, when the opening is formed in the brackets, there is a fear that injection of a resin by pressurization results in flowing of the resin from the opening.

SUMMARY OF THE INVENTION

A method for manufacturing an electric motor stator according to one aspect of the present invention includes: attaching a hollow bracket to an end of a hollow stator core around which a winding is wound, and allowing a lead connected to the winding to pass through an opening formed in a peripheral surface of the bracket to take out the lead to an outside of the bracket; placing a core material inside the stator core and the bracket; attaching a sealing member with a through-hole that is smaller than the opening to an outer peripheral surface of the bracket so as to block the opening while allowing the lead to pass through the through-hole; and filling a molten resin into an annular space between the stator core and the bore material and between the bracket and the core material, to form a resin unit.

An electric motor stator according to another aspect of the present invention is an electric motor stator manufactured by the above-described manufacturing method, wherein a molded surface of the resin unit in the opening formed when filling the molten resin does not protrude from an outer peripheral surface of the bracket.

Further, an electric motor according to another aspect of the present invention includes the above-described stator.

BRIEF DESCRIPTION OF THE DRAWINGS

The objectives, features, and advantages of the present invention will become further apparent from the following description of embodiments in conjunction with the accompanying drawings, in which.

DETAILED DESCRIPTION

Figure 1:
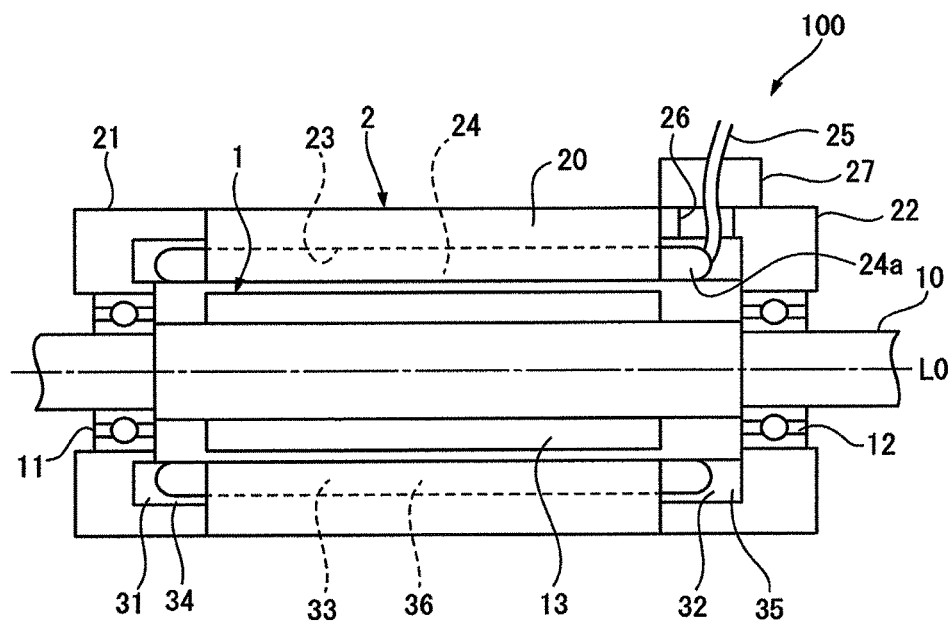
FIG. 1 is a view that schematically illustrates the internal structure of an electric motor according to an embodiment of the present invention.

Embodiments of the present invention will be described below with reference to FIG. 1 to FIG. 8. FIG. 1 is a cross-sectional view that schematically illustrates the internal structure of an electric motor 100 according to an embodiment of the present invention. The electric motor 100 is a three-phase induction motor including a rotor 1 and a stator 2, and is used, for example, for driving a spindle of a working machine.

As illustrated in FIG. 1, the rotor 1 includes a rotating shaft 10 which extends along a central axis L0, and both ends of the rotating shaft 10 are rotatably supported by bearings 11 and 12, respectively. A rotor core 13 formed by layering plural electromagnetic steel sheets is integrally attached to the rotating shaft 10. Plural slot holes parallel to the axis L0 are formed in the rotor core 13. A metal rod or a metal is filled in each slot hole. These metal rods or metals are short-circuited by a short-circuit ring on both ends thereof. Hereinafter, the direction parallel to the axis L0 is referred to as an axial direction, the direction that radially extends from the axis L0 is referred to as a radial direction, and the direction along the peripheral surface of a circle with a center through which the axis L0 passes is referred to as a circumferential direction.

The stator 2 includes a hollow stator core 20 with a center through which the axis L0 passes. The stator core 20 is formed by layering plural electromagnetic steel sheets and is placed to form a gap between the entire periphery thereof and the outer peripheral surface of the rotor 1. Brackets 21 and 22 are attached to both axial ends of the stator core 20. The brackets 21 and 22 are integrally coupled to the stator core 20 by a penetration bolt (not illustrated) that penetrates the stator core 20 in the axial direction.

Plural slot holes 23 are extended along the axial full length at circumferential regular intervals in the inner peripheral surface of the stator core 20. Windings 24 for a three-phase current which are electrically independent, i.e., a winding for a U-phase, a winding for a V-phase, and a winding for a W-phase are alternately arranged in each slot hole 23. Each lead 25 (cable) is connected to each of the coil end units 24a of the windings 24. Each lead 25 passes through an opening 26 formed in the radial direction in the bracket 22 and is taken out to the outside of the stator 2. A terminal box 27 is mounted on the outer peripheral surface of the bracket 22, and each lead 25 is connected to a power cable through the terminal box 27. By feeding a power to each winding 24 through each lead 25, a rotating magnetic field is formed to rotate the rotor 1.

A resin is filled into each of a gap 31 or 32 between each of the brackets 21 and 22 and each coil end unit 24a of each winding 24, and a gap 33 between each slot hole in the stator core 20 and each winding 24, to form annular resin units 34 to 36 in inner peripheral parts of the brackets 21 and 22 and the stator core 20. The resin unit 36 is connected to the resin units 34 and 35, and the resin units 34 to 36 are formed in series in the axial direction.

Figure 2:
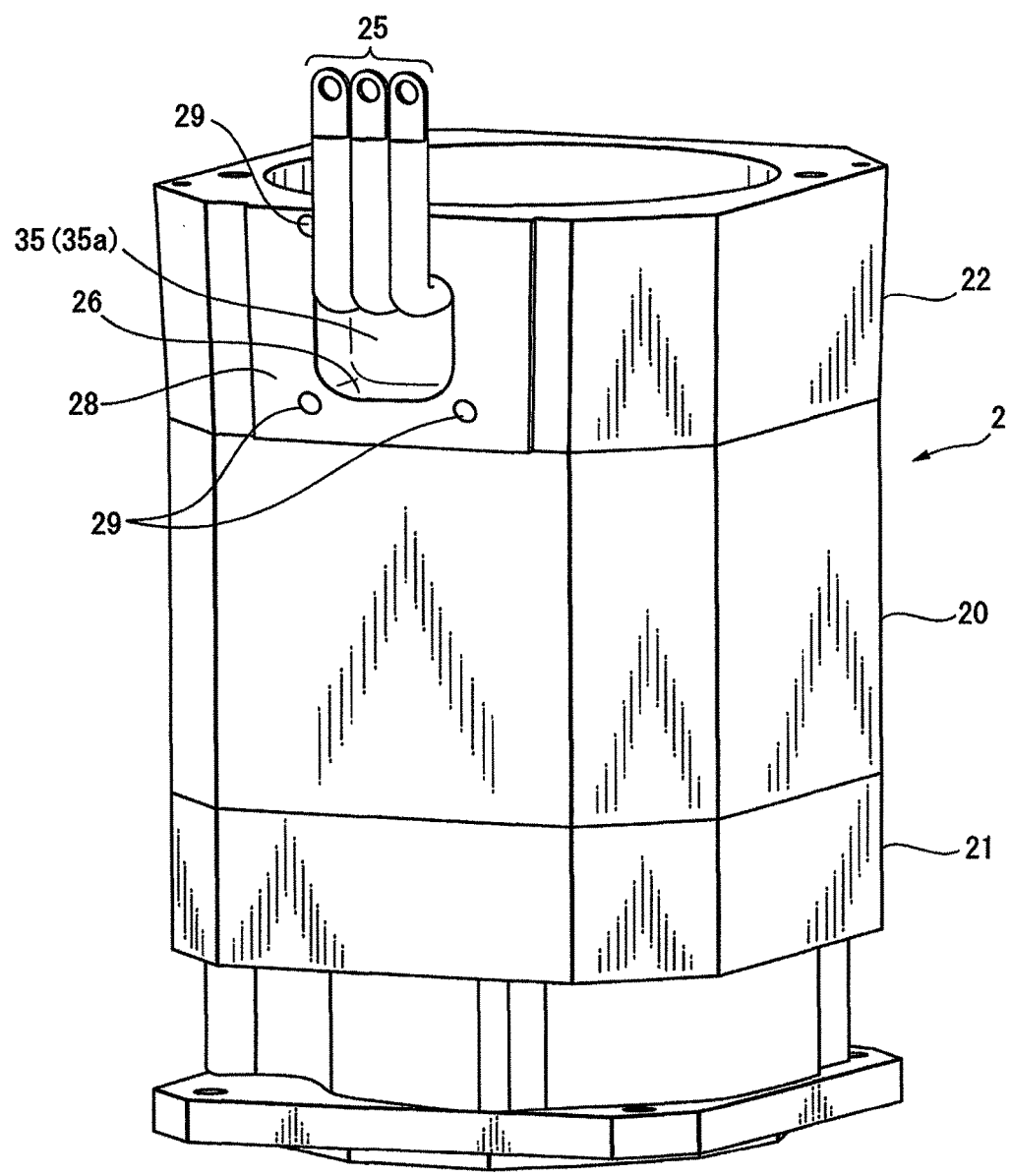
FIG. 2 is a perspective view of the stator illustrated in FIG. 1.

FIG. 2 is a perspective view of the stator 2. As illustrated in FIG. 2, the opening 26 in the bracket 22 has a generally rectangular shape, and three leads 25 protrude in a row from the opening 26 along the edge of the opening 26. A seating face 28 for attaching the terminal box 27 (FIG. 1) is formed around the opening 26. Thread holes 29 for attaching the terminal box are formed in the seating face 28.

The resin unit 35 is formed on the internal side of the opening 26, and a surface (molded surface 35a) of the resin unit 35 is exposed outward. The molded surface 35a is located at a position closer to the radially internal side than the outer peripheral surface, i.e., the seating face 28 of the bracket 22, and is dented from the seating face 28. The terminal box 27 can be easily attached to the seating face 28 without interfering with the resin unit 35 by allowing the molded surface 35a to be located at a position closer to the radially internal side than the seating face 28 in such a manner. In addition, the flexibility of the leads 25 is maintained in a state in which the resin unit 35 is formed, and the connection to the terminal box 27 is facilitated.

Figure 3:
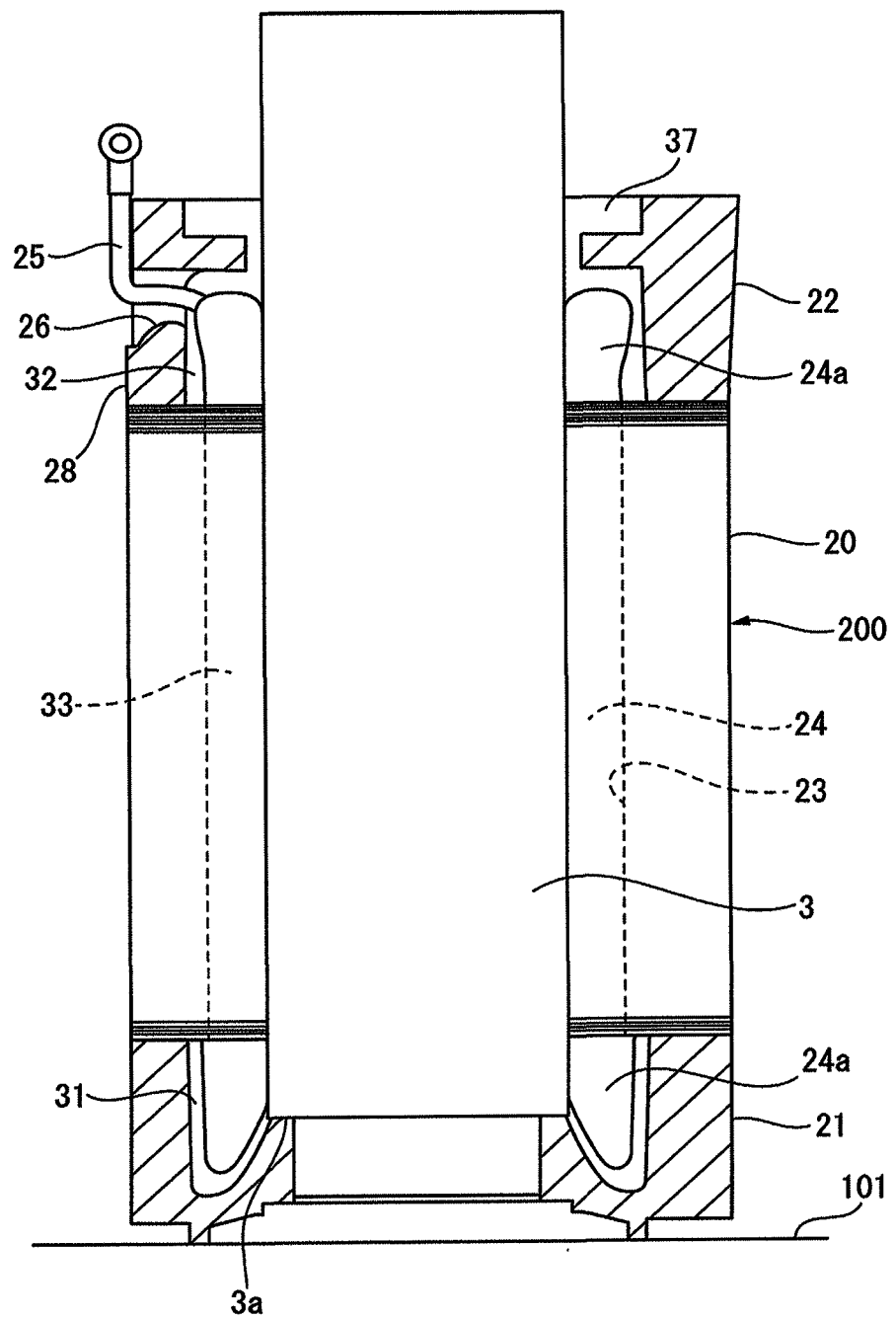
FIG. 3 is a view showing a method for manufacturing an electric motor stator according to an embodiment of the present invention.
Figure 4:
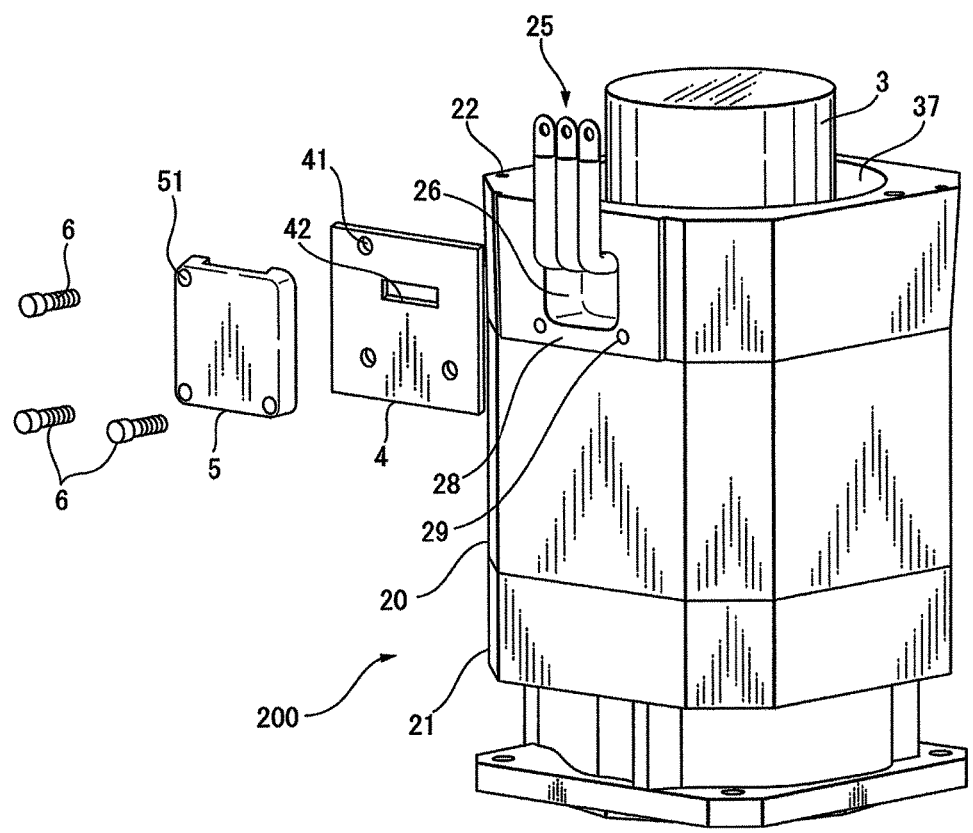
FIG. 4 is a further view showing a method for manufacturing an electric motor stator according to the embodiment of the present invention.

A method for molding the resin units 34 to 36 of the stator 2 (resin molding method) will be described below. FIG. 3 is a view that indicates a procedure of a method for manufacturing an electric motor stator according to an embodiment of the present invention, i.e., a cross-sectional view of a stator assembly, and FIG. 4 is a perspective view thereof. First, windings 24 are wound around a stator core 20, and brackets 21 and 22 are attached to both axial ends of the stator core 20 using a penetration bolt to form a stator assembly 200 in which the stator core 20 and the brackets 21 and 22 are integrated. In this case, leads 25 connected to ends of the windings 24 are allowed to pass through an opening 26 in the bracket 22 and are taken out to the outside of the bracket 22.

In this state, as illustrated in FIG. 3, a cylindrical core material 3 is inserted into the stator assembly 200 to penetrate the stator core 20 and the brackets 21 and 22, and the stator assembly 200 is put on a top surface 101 of a table in a upright installation state in which the bracket 21 is in a lower side and the bracket 22 is in an upper side. The diameter of the outer peripheral surface of the core material 3 is approximately equal to the diameter of the inner peripheral surface of the stator core 20, and the core material 3 is placed in the inside of the stator core 20 without any gap except the sites of slot grooves 23. The diameter of the outer peripheral surface of the core material 3 may be allowed to be smaller than the diameter of the inner peripheral surface of the stator core 20 to form a gap over the entire periphery between the core material 3 and the stator core 20.

A stepped unit 3a is formed in a tip of the core material 3, and an axial end surface of the stepped unit 3a abuts with an axial end surface of the bracket 21 in the state of inserting the core material 3. In this case, an annular resin injection unit 37 is formed between the inner peripheral surface of the upper end of the bracket 22 and the outer peripheral surface of the core material 3. The resin injection unit 37 communicates with a gap 31 between the bracket 21 in the lower side and each coil end unit 24a through a gap 32 between the bracket 22 and a coil end unit 24a, and through a gap 33 between each slot hole 23 and each winding 24.

Figure 5:
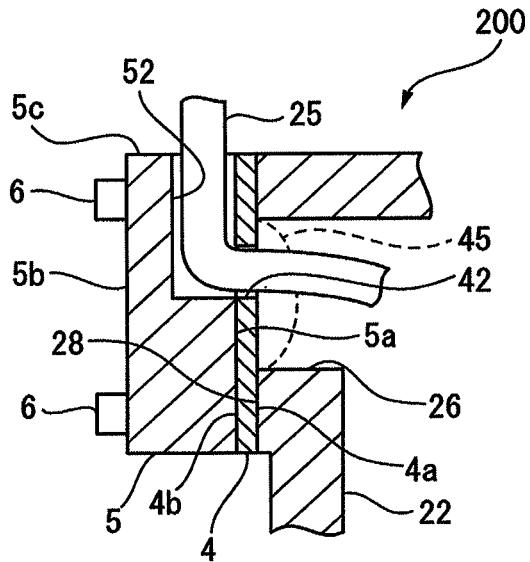
FIG. 5 is a further view showing a method for manufacturing an electric motor stator according to the embodiment of the present invention.

Then, as illustrated in FIG. 4, a sealing member 4 is mounted on a seating face 28 of the bracket 22 and further a holding member 5 is mounted on the outside of the sealing member 4, respectively, using bolts 6. In other words, the bolts 6 are threadedly engaged in bolt holes 29 through through-holes 41 in the sealing member 4 and through-holes 51 in the holding member 5. FIG. 5 is a view that indicates a procedure of the method for manufacturing an electric motor stator according to the embodiment of the present invention, i.e., a cross-sectional view of the principal units of the stator assembly 200, illustrating the state of attaching the sealing member 4 and the holding member 5.

As illustrated in FIGS. 4 and 5, the sealing member 4 is a plate-like member having a first face 4a and a second face 4b, a rectangular shape, and a predetermined thickness, and is formed of a rubber material or the like having heat resistance up to at least a resin molding temperature. A through-hole 42 that is smaller than the opening 26 and has a rectangular shape, corresponding to the positions of the leads 25 taken from the opening 26, is opened in the sealing member 4. The sealing member 4 is attached to the seating face 28 in the state of allowing the first face 4a to face the seating face 28 and the leads 25 to pass through the through-hole 42. In FIG. 4, the leads 25 are bent upward, where the leads 25 are allowed to pass through the through-hole 42 and thereafter bent upward.

Figure 6:
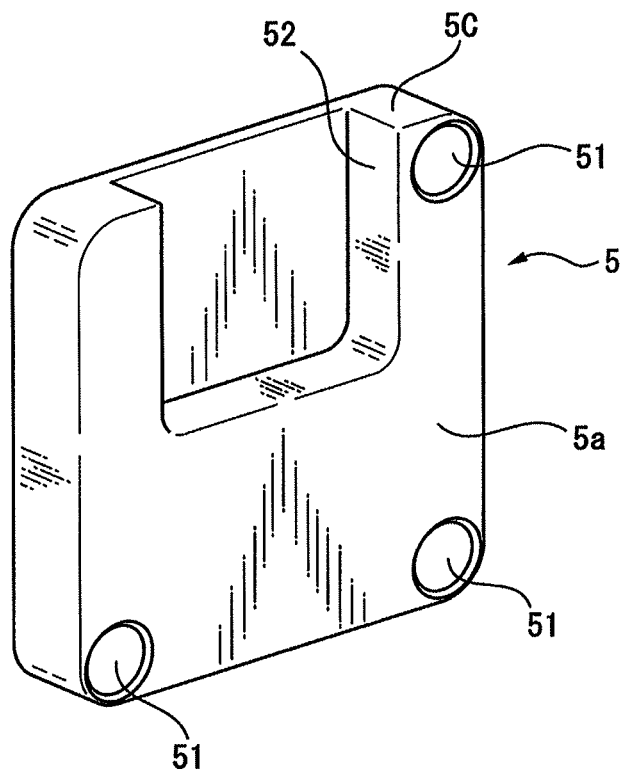
FIG. 6 is a perspective view of the holding member illustrated in FIG. 5.

The holding member 5 is a plate-like member having a rectangular shape of which the plate thickness is thicker than the sealing member 4, which has a first face 5a and a second face 5b, and is formed of a metal, a resin, or the like, of which the linear expansion coefficient is lower than that of the sealing member 4. FIG. 6 is a perspective view of the holding member 5 viewed from the first face 5a. As illustrated in FIG. 6, a concave part 52, corresponding to the positions of the leads 25, is formed in the first face 5a of the holding member 5.

The width of the concave unit 52 is approximately equal to the width of the through-hole 42 in the sealing member 4, and the depth of the concave unit 52 is approximately equal to the outer diameter of the leads 25. The concave unit 52 is extended to an upper end surface 5C of the holding member 5. As illustrated in FIG. 5, the holding member 5 is attached to the first face 5a thereof so as to be in contact with the second face 4b of the sealing member 4, and the leads 25 bent upward are stored in the concave unit 52 and protrude from the upper end surface 5C of the holding member 5 in the state of attaching the holding member 5.

The sealing member 4 and the holding member 5 are attached as described above, thereafter, the stator assembly 200 is heated, and a molten resin is injected from the resin injection unit 37 (FIG. 3) between the bracket 22 and the core material 3. The molten resin is obtained by melting a thermosetting resin, and the injected molten resin flows downward by gravity. As a result, the gaps 31 to 33 between the stator assembly 200 and the core material 3 are filled with the molten resin to form the resin units 34 to 36.

Figure 7:
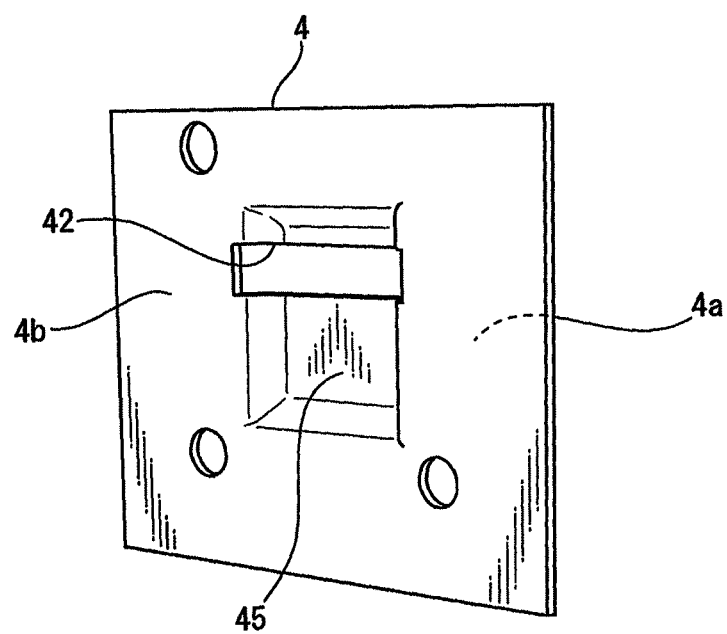
FIG. 7 is a perspective view that illustrates a state in which the sealing member illustrated in FIG. 5 is thermally expanded.

Before injecting the resin, the sealing member 4 has been thermally expanded by heating the stator assembly 200, and a gap between the through-hole 42 in the sealing member 4 and the leads 25 has been blocked. Thereby, outflow of the resin from the opening 26 can be prevented. In this case, the sealing member 4 is prevented from being deformed toward the second face 4b by the holding member 5 and is therefore deformed toward the first face 4a by the thermal expansion as illustrated in FIG. 7. In other words, the sealing member 4 is bulged along the opening 26 to form a bulged unit 45 as illustrated in the dotted line of FIG. 5. Therefore, the resin is pushed into the radially internal side by the bulged unit 45, and the molded surface 35a (FIG. 2) of the resin unit 35 in the inside of the opening 26 is dented from the seating face 28. As a result, the molded surface 35a can be prevented from protruding into the radially external side from the seating face 28.

After solidification of the molten resin, the core material 3 is taken out, the bolts 6 are removed, and the holding member 5 and the sealing member 4 are removed. As described above, the electric motor stator 2 is completed. Then, the terminal box 27 is attached to the seating face 28 of the stator 2 by threadedly engaging bolts into the thread holes 29.

Figure 8:
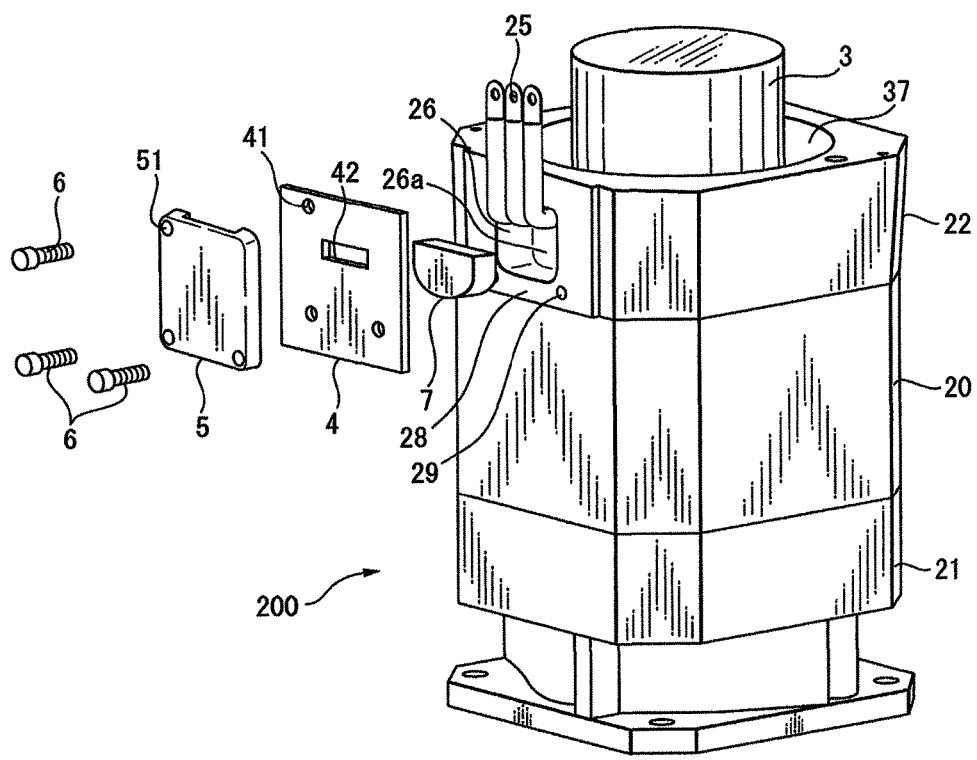
FIG. 8 is a view that illustrates a variation of FIG. 4.

FIG. 8 is a view that illustrates a variation of FIG. 4. In the example of FIG. 8, an insertion member 7 having a predetermined thickness is inserted into an underside space 26a in an opening 26 in the lower area of the leads 25, and a sealing member 4 and a holding member 5 are attached to a seating face with bolts 6. The insertion member 7 is formed to have a shape along the opening 26, and the underside space 26a is blocked by the insertion member 7. The sealing member 4 is deformed along the opening 26 to push the insertion member 7 into the radially internal side by heating a stator assembly 200. Thereby, a molded surface 35a of a resin unit 35 can be located in a position closer to the radially internal side than in the case of using the manufacturing method of FIG. 4. The position of the molded surface 35a in the radial direction can be easily adjusted by appropriately setting the thickness of the insertion member 7.

According to the present embodiments, operational effects as described below can be produced.

(1) The method for manufacturing the electric motor stator 2 includes attaching the brackets 21 and 22 to both axial ends of the stator core 20 around which the windings 24 are wound, and allowing the leads 25 connected to the windings 24 to pass through the opening 26 formed in the peripheral surface of the bracket 22 to take out the leads 25 to the outside of the bracket 22 (FIG. 3); placing the core material 3 inside the stator core 20 and the brackets 21 and 22 (FIG. 3); attaching the sealing member 4 with the through-hole 42 that is smaller than the opening 26 to the outer peripheral surface (seating face 28) of the bracket 22 so as to block the opening 26 while allowing the leads 25 to pass through the through-hole 42 (FIG. 4); and filling the molten resin into the annular spaces (gaps 31 to 33) between the stator core 20 and the brackets 21 and 22, and the core material 3, to form the resin units 34 to 36. Therefore, the opening 26 can be sealed with the sealing member 4 to prevent the outflow of the resin from the opening 26.

In the stator 2 manufactured by such a manufacturing method, the molded surface 35a of the resin unit 35 in the opening 26 does not protrude from the seating face 28 of the bracket 22 into the radially external side (FIG. 2). Therefore, the terminal box 27 can be easily attached to the seating face 28 after removal of the sealing member 4. In other words, removal of a protrusion is needed since it is impossible to attach the terminal box 27 without being processed when the molded surface 35a protrudes from the seating face 28, whereas the operation of removing the protrusion is not needed in the present embodiments.

(2) In the step of attaching the sealing member 4, the holding member 5 comprised of the material of which the linear expansion coefficient is lower than that of the sealing member 4 is brought into contact with the external surface (second face 4b) of the sealing member 4, and the sealing member 4 is attached. Therefore, when the sealing member 4 is thermally expanded, the sealing member 4 is prevented from being deformed toward the radially external side by the holding member 5 to deform the sealing member 4 toward the inside of the opening 26. As a result, the molded surface 35a of the resin unit 35 can be allowed to have a shape dented from the seating face 28, and the molded surface 35a can be reliably prevented from protruding into a position closer to the radially external side than the seating face 28.

(3) In the step of filling the molten resin, the stator core 20 to which the brackets 21 and 22 are attached, i.e., the stator assembly 200 is installed upright, and the molten resin is injected from the resin injection unit 37 in the upper area of the gaps 31 to 33. The injected molten resin flows downward by gravity and is filled into the gaps 31 to 33. By injecting the molten resin from above in such a manner, the need of a pressure-applying apparatus or the like for filling the resin into the gaps 31 to 33 is eliminated, and the molding operation can be easily carried out.

(4) The insertion member 7 can also be inserted into the opening 26 to partially block the opening 26, followed by attaching the sealing member 4 (FIG. 8). Thereby, the molded surface 35a of the resin unit 35 in the opening 26 can be easily shifted toward the radially internal side.

(5) The thread holes 29 for attaching the terminal box 27 are formed in the seating face 28 of the bracket 22, and the sealing member 4 is attached using the thread holes 29 (FIG. 4). Thereby, the need for separately forming a thread hole for attaching the sealing member 4 is eliminated, and the shape of the bracket 22 can be simplified.

The structure of the stator core 20 and the brackets 21 and 22, i.e., the structure of the electric motor stator is not limited to the structure described above. The molded surface 35a of the resin unit 35 in the opening 26 preferably protrudes from the outer peripheral surface of the stator core 20 into the radially external side. For example, the molded surface 35a and the outer peripheral surface of the stator core 20 may be on the same plane. The structure of the core material 3, the sealing member 4, and the holding member 5, which are jigs for manufacturing the electric motor stator 2, is not limited to the structure described above. The sealing member 4 may be attached without using the holding member 5. In view of the order of the step of placing the core material 3 and the step of attaching the sealing member 4, either of the steps may be carried out earlier. A gap between the core material 3 and the inner peripheral surface of the stator core 20 may also be formed to fill a resin into the gap.

Although the brackets 21 and 22 are attached to both axial ends of the stator core 20 in the above-described embodiments, the present invention can be similarly applied to attachment of a bracket only to one axial end. Although the molten resin is injected from above in the state in which the stator assembly 200 is installed upright in the above-described embodiments, the molten resin may be injected from below by pressurization. The resin may be injected by injection molding. The molten resin may be injected from a plurality of points. The resin may be filled in a vacuum. Separately from the attaching unit for the terminal box 27, an attaching unit for the sealing member 4 may be placed on the outer peripheral surface of the bracket 22. Although the terminal box 27 is attached to the seating face 28 around the opening 26 in the above-described embodiments, another attachment component for the electric motor 100, such as a bolt for suspension of the electric motor 100, may be attached. Although the opening 26 has a generally rectangular shape in the above-described embodiments, the opening 26 corresponding to the shape of the leads 25 may be formed so that a gap between the opening 26 and the leads 25 is uniform over the entire periphery. For example, three circles corresponding to the three leads 25 may be connected to form the opening.

The present invention is not limited to an electric motor for driving the spindle of a working machine but can be similarly applied to another electric motor including a stator which has a bracket in which an opening for taking out a lead is formed, and in which a resin is filled into the opening. The electric motor may be an electric motor other than a three-phase induction motor.

One or more of the above-described embodiments and the variation can be optionally combined.

In accordance with the present invention, a lead is allowed to pass through a through-hole in a sealing member, and the sealing member is attached to the outer peripheral surface of a bracket so as to block an opening for taking out the lead. Thereby, outflow of a molten resin from the opening by injecting the resin can be prevented.

Although the present invention was described above with reference to the preferred embodiments thereof, it should be understood by those skilled in the art that various modifications and alterations can be made without departing from the scope of the disclosure of the claims described below.

The invention claimed is:

1. An electric motor stator manufacturing by steps of:
   attaching a hollow bracket to an end of a hollow stator core around which a winding is wound, and allowing a lead connected to the winding to pass through an opening formed in a peripheral surface of the bracket to take out the lead to an outside of the bracket;
   placing a core material inside the stator core and the bracket;
   attaching a sealing member with a through-hole smaller than the opening to an outer peripheral surface of the bracket so as to block the opening while allowing the lead to pass through the through-hole; and
   filling a molten resin into an annular space as gap between the stator core and the core material and between the bracket and the core material, to form a resin unit, wherein a molded surface of the resin unit in the opening formed by the step of filling the molten resin does not protrude from the outer peripheral surface of the bracket.

2. An electric motor comprising the electric motor stator manufactured according to the method of claim 1.

* * * * *